United States Patent
Naitou et al.

(10) Patent No.: US 10,570,971 B2
(45) Date of Patent: *Feb. 25, 2020

(54) WORK VEHICLE

(71) Applicant: Komatsu Ltd., Tokyo (JP)

(72) Inventors: Shinichi Naitou, Yuki (JP); Takuya Ishizaka, Oyama (JP)

(73) Assignee: Komatsu Ltd., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 15/755,236

(22) PCT Filed: Mar. 16, 2016

(86) PCT No.: PCT/JP2016/058333
§ 371 (c)(1),
(2) Date: Feb. 26, 2018

(87) PCT Pub. No.: WO2017/158760
PCT Pub. Date: Sep. 21, 2017

(65) Prior Publication Data
US 2018/0252278 A1    Sep. 6, 2018

(51) Int. Cl.
*F16D 55/40*    (2006.01)
*B60T 1/06*    (2006.01)
(Continued)

(52) U.S. Cl.
CPC .............. *F16D 55/40* (2013.01); *B60K 1/02* (2013.01); *B60K 7/0007* (2013.01); *B60K 11/06* (2013.01);
(Continued)

(58) Field of Classification Search
CPC .............. F16D 55/40; F16D 65/0031; F16D 2065/788; F16D 65/847; F16D 2055/0037;
(Continued)

(56) References Cited

U.S. PATENT DOCUMENTS 3,217,844 A * 11/1965 Nelson ................... F16D 55/40
                                                      188/264 AA
3,251,437 A *  5/1966 Moyer ................... F16D 55/40
                                                      188/264 AA
(Continued)

FOREIGN PATENT DOCUMENTS

DE    102005017173 A1 * 10/2006 ............. F16D 67/04
JP       06-109046 A      4/1994
(Continued)

OTHER PUBLICATIONS

International Search Report dated May 10, 2016, issued for PCT/JP2016/058333.

*Primary Examiner* — Xuan Lan Nguyen

(74) *Attorney, Agent, or Firm* — Locke Lord LLP

(57) ABSTRACT

A parking brake of a work vehicle has a piston near the wheel relative to an end plate in an axial direction parallel to a rotation axis of the drive shaft to move in the axial direction, a hub between the end plate and the piston in the axial direction to be connected to the drive shaft, a cylinder disposed outwardly from the hub in a radial direction relative to the rotation axis, a disk supported by the hub in an inner space defined by the end plate, the piston, the hub, and the cylinder, a separator supported by the cylinder, next to the disk in the inner space, and moved by the piston in the axial direction, a first passage connecting the inner space and an outer space, and a second passage provided outwardly from the first passage in the radial direction to connect the inner and outer spaces.

5 Claims, 9 Drawing Sheets

(51) Int. Cl.

| | |
|---|---|
| *F16D 65/18* | (2006.01) |
| *F16D 55/24* | (2006.01) |
| *F16D 65/847* | (2006.01) |
| *B60T 13/22* | (2006.01) |
| *B60K 1/02* | (2006.01) |
| *B60K 7/00* | (2006.01) |
| *B60K 11/06* | (2006.01) |
| *F16D 65/00* | (2006.01) |
| *F16D 121/14* | (2012.01) |
| *F16D 121/06* | (2012.01) |
| *B60K 1/00* | (2006.01) |

(52) U.S. Cl.
CPC .............. *B60T 1/062* (2013.01); *B60T 13/22* (2013.01); *F16D 55/24* (2013.01); *F16D 65/0031* (2013.01); *F16D 65/186* (2013.01); *F16D 65/847* (2013.01); *B60K 2001/006* (2013.01); *B60K 2007/0046* (2013.01); *B60Y 2200/142* (2013.01); *B60Y 2400/42* (2013.01); *B60Y 2400/424* (2013.01); *F16D 2121/06* (2013.01); *F16D 2121/14* (2013.01)

(58) Field of Classification Search
CPC .......... B60K 1/02; B60K 11/06; B60K 7/007; B60Y 2200/142
See application file for complete search history.

(56) References Cited

U.S. PATENT DOCUMENTS

| | | | | |
|---|---|---|---|---|
| 3,983,974 | A * | 10/1976 | Dowell | ................... B60T 1/065 188/264 AA |
| 4,446,953 | A * | 5/1984 | Voss | ........................ F16D 13/72 192/112 |
| 5,215,168 | A | 6/1993 | Guiot et al. | |
| 2017/0066318 | A1 | 3/2017 | Uranaka et al. | |
| 2017/0129331 | A1* | 5/2017 | Naitou | ...................... F16J 15/34 |
| 2018/0354473 | A1* | 12/2018 | Naitou | ................... B60T 1/062 |

FOREIGN PATENT DOCUMENTS

| | | |
|---|---|---|
| JP | 09-240468 A | 9/1997 |
| JP | 2015-068495 A | 4/2015 |
| WO | 2015/129005 A1 | 9/2015 |

* cited by examiner

WORK VEHICLE

This application is related to co-pending application: "WORK VEHICLE" filed on Feb. 19, 2018, U.S. Ser. No. 15/753,420, in the names of Shinichi NAITOU and Takuya ISHIZAKA as a national phase entry of PCT/JP2016/058332 filed Mar. 16, 2016, which application is assigned to the assignee of the present application and is incorporated by reference herein.

FIELD

The present invention relates to a work vehicle.

BACKGROUND

In a technological field relating to work vehicles, a large autonomous off-road dump truck as disclosed in Patent Literature 1 is known.

CITATION LIST

Patent Literature

Patent Literature 1: WO 2015/129005 A

SUMMARY

Technical Problem

A work vehicle provided with a parking brake may generate abrasion powder from a disk of the parking brake. Furthermore, foreign matter in an outer space may be attached on the disk. Therefore, it is desired to provide a technology for smoothly discharging a generated amount of abrasion from the parking brake and for inhibiting the intrusion of the foreign matter into the parking brake.

An object of the aspects of the present invention is to provide a work vehicle including a parking brake configured to smoothly discharge abrasion powder and to inhibit the intrusion of foreign matter.

Solution to Problem

According to an aspect of the present invention, a work vehicle comprises: a vehicle body frame; an electric motor supported by the vehicle body frame; a power transmission mechanism including a drive shaft connected to an output shaft of the electric motor, the power transmission mechanism transmitting power generated by the electric motor to a wheel on which a tire is mounted; a supporting member supported by the vehicle body frame, the supporting member rotatably supporting the drive shaft; and a parking brake configured to restrict a rotation of the drive shaft, the parking brake including: an end plate supported by the supporting member; a piston disposed near the wheel relative to the end plate in an axial direction parallel to a rotation axis of the drive shaft, the piston moving in the axial direction; a hub disposed between the end plate and the piston in the axial direction, the hub being connected to the drive shaft; a cylinder disposed outwardly from the hub and the piston in a radial direction relative to the rotation axis; a disk supported by the hub and disposed in an inner space defined by the end plate, the piston, the hub, and the cylinder; a separator plate supported by the cylinder, disposed next to the disk in the inner space, and moved by the piston in the axial direction; a first outlet passage configured to connect the inner space and an outer space; and a second outlet passage provided outwardly from the first outlet passage in the radial direction, the second outlet passage connecting the inner space and an outer space, the first outlet passage being provided between the piston and the hub, the second outlet passage being provided in the cylinder.

Advantageous Effects of Invention

According to the aspects of the present invention, a work vehicle including a parking brake configured to smoothly discharge abrasion powder and to inhibit the intrusion of foreign matter can be provided.

DESCRIPTION OF EMBODIMENTS

The embodiments according to the present invention will be described below with reference to the drawings, but the present invention is not limited to the description. The component elements of the embodiments described below may be appropriately combined with each other. Furthermore, some of the component elements may not be used.

In the following description, an X-Y-Z rectangular coordinate system is set, and a positional relationship between units will be described with reference to the X-Y-Z rectangular coordinate system. A direction parallel to a first axis in a predetermined plane is represented as an X-axis direction, a direction parallel to a second axis in the predetermined plane perpendicular to the first axis is represented as a Y-axis direction, and a direction parallel to a third axis perpendicular to the predetermined plane is represented as a Z-axis direction.

[Dump Truck]

Figure 1:
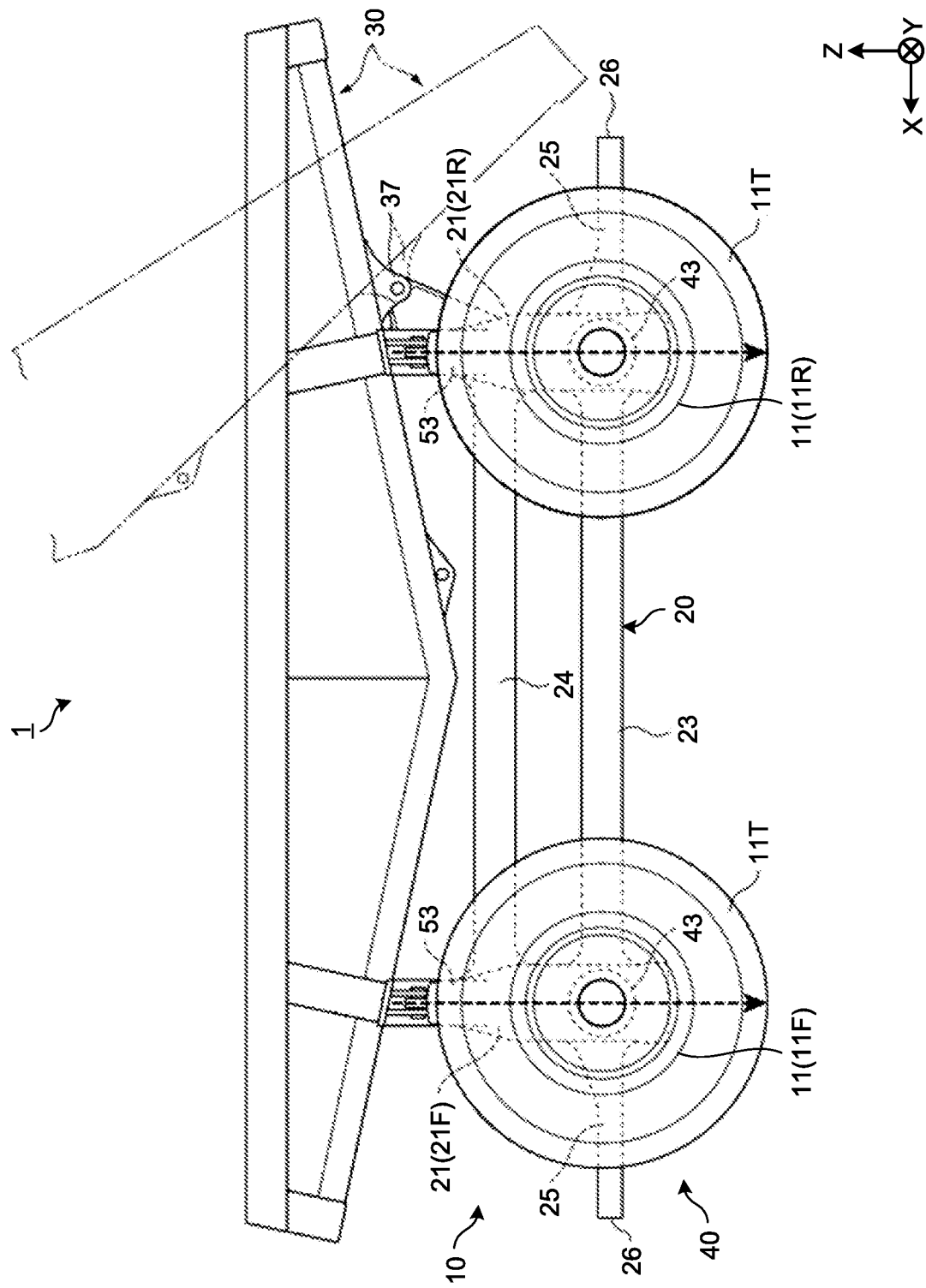
FIG. 1 is an exemplary side view of a work vehicle according to the present embodiment.
Figure 2:
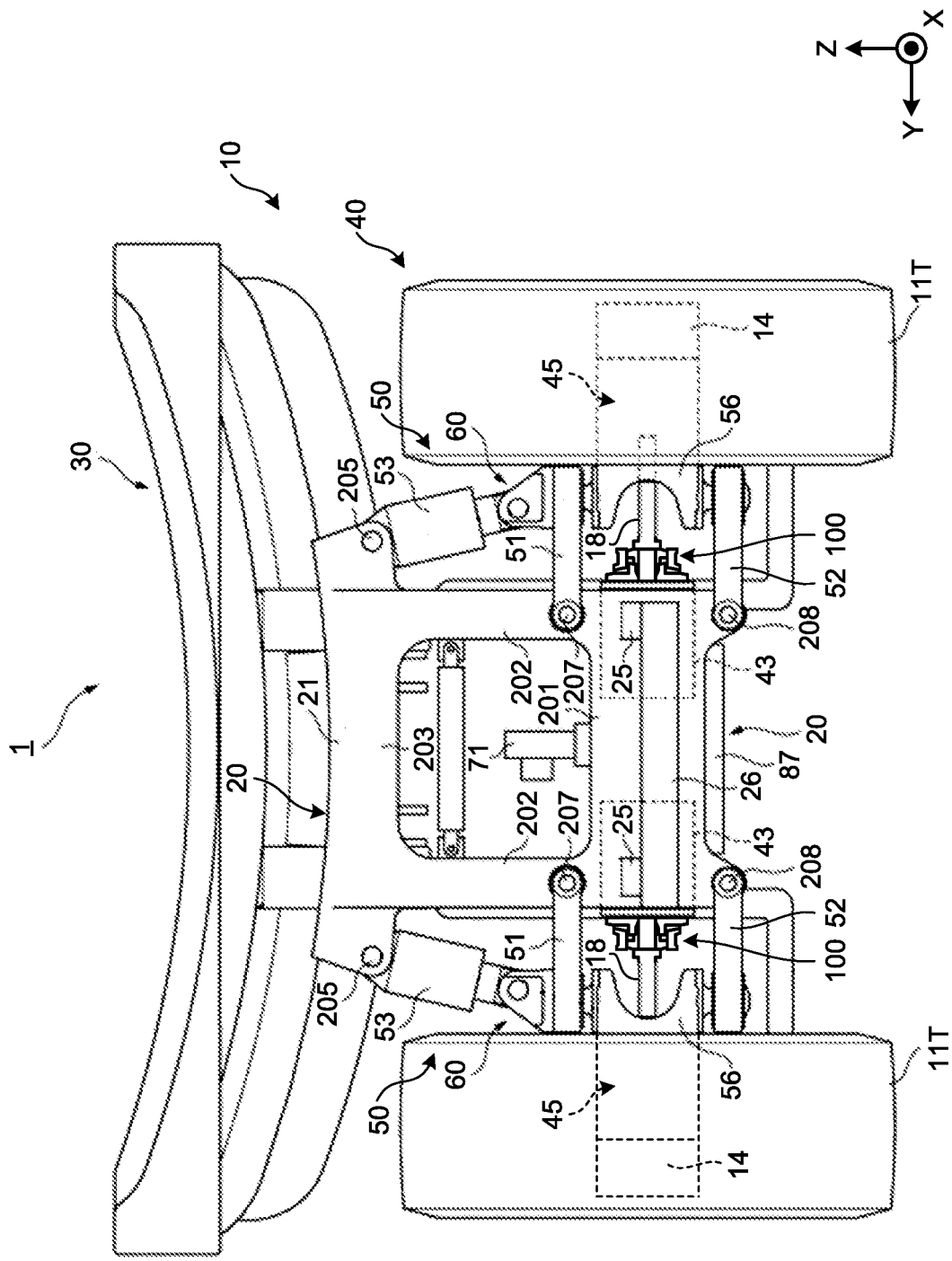
FIG. 2 is an exemplary view of the work vehicle according to the present embodiment viewed in a +X direction.

FIG. 1 is an exemplary side view of a work vehicle 1 according to the present embodiment. FIG. 2 is an exemplary view of the work vehicle 1 according to the present embodiment viewed in a +X direction. In the present embodiment, the work vehicle 1 is a dump truck which is loaded and travels in a mining site. The dump truck is an off-road dump truck which is remotely controlled to autonomously travel. The dump truck has no cab. The dump truck includes a communication device communicating with a control station. The control station transmits a command signal to the dump truck to remotely control the dump truck. In the following description, the work vehicle 1 is referred to as a dump truck 1.

In the present embodiment, the dump truck 1 travels in the +X direction for ease of description. The X-axis direction represents a front-rear direction of the dump truck 1, the Y-axis direction represents a vehicle width direction of the dump truck 1, and the Z-axis direction represents a vertical direction of the dump truck 1.

As illustrated in FIGS. 1 and 2, the dump truck 1 includes a vehicle body 10, a dump body 30 supported by the vehicle body 10, and a travel unit 40 supported by a vehicle body frame 20 of the vehicle body 10.

The travel unit 40 includes wheels 11 on which tires 11T are mounted, and electric motors 43 for generating power to drive the respective wheels 11. The wheels 11 include a wheel 11F disposed forward of the center of the vehicle body frame 20 and a wheel 11R disposed backward of the center of the vehicle body frame 20. The wheels 11F are disposed on both sides in a vehicle width direction. The wheels 11R are disposed on both sides in a vehicle width direction. Four electric motors 43 are provided to drive four wheels 11 individually.

The dump body 30 is a loaded member. The dump body 30 is rotatable about a pivot portion 37 by the operation of a hoist cylinder. As indicated by a two-dot chain line in FIG. 1, the dump body 30 performs dumping operation to unload material on the dump body 30 from the dump body 30.

[Travel Unit]

Figure 3:
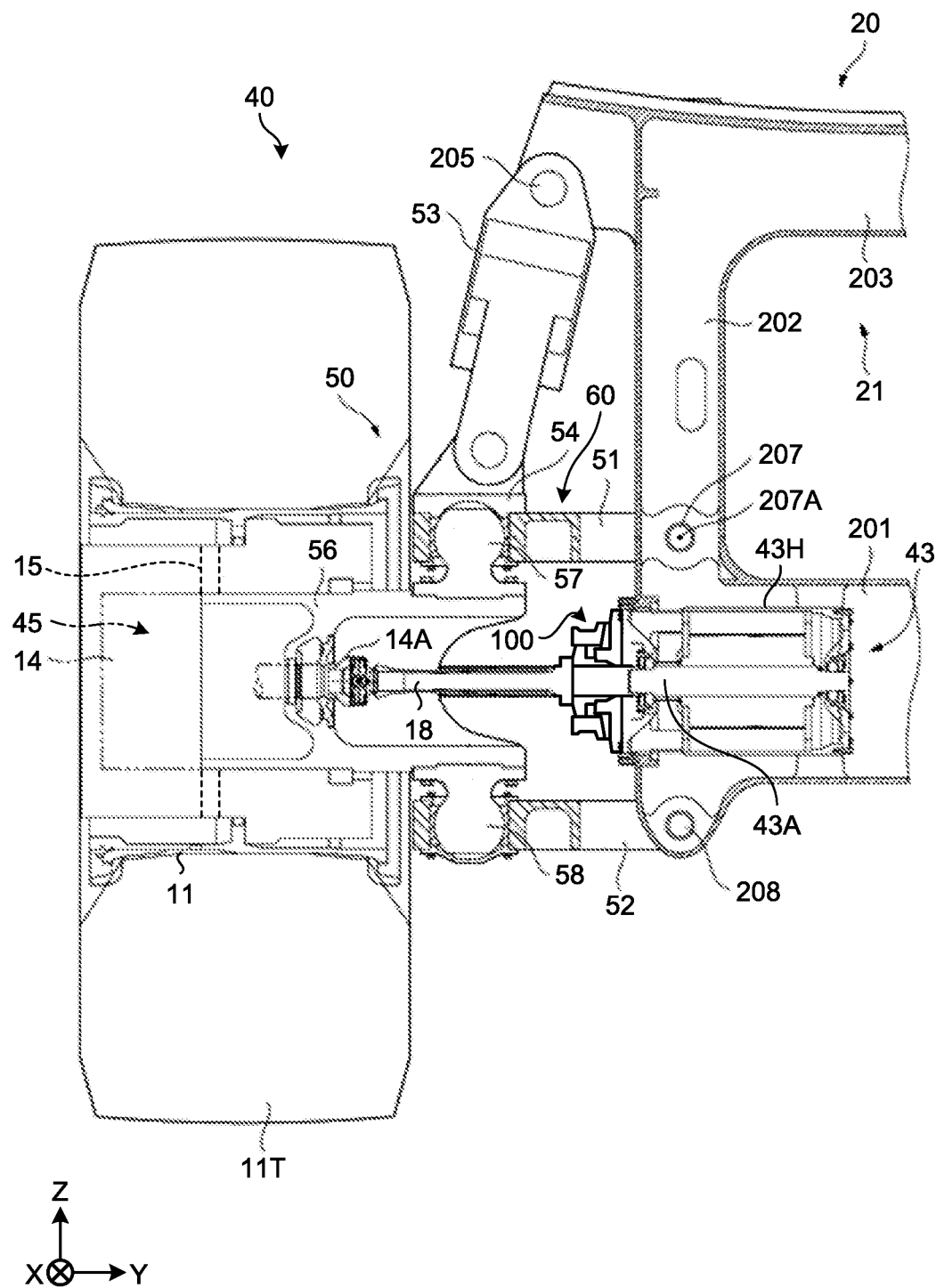
FIG. 3 is an exemplary cross-sectional view of a travel unit according to the present embodiment.

FIG. 3 is an exemplary cross-sectional view of the travel unit 40 according to the present embodiment. As illustrated in FIGS. 1, 2, and 3, the travel unit 40 includes the electric motors 43, and power transmission mechanisms 45 each including a drive shaft 18 connected to an output shaft 43A of each electric motor 43 and a decelerator 14 connected to the drive shaft 18. The decelerator 14 is at least partially connected to the wheel 11. The power transmission mechanism 45 including the drive shaft 18 and the decelerator 14 transmits power generated by the electric motor 43 to the wheel 11.

The vehicle body frame 20 includes vertical frames 21 for supporting the electric motors 43. The vertical frames 21 include a vertical frame 21F for supporting the electric motors 43 for generating power to drive the wheels 11F and a vertical frame 21R for supporting the electric motors 43 for generating power to drive the wheels 11R. The vertical frame 21F is provided at a front portion of the vehicle body frame 20. The vertical frame 21R is provided at a rear portion of the vehicle body frame 20. One vertical frame 21 supports two electric motors 43.

As illustrated in FIG. 1, the vertical frame 21F and the vertical frame 21R are connected to each other via a lower side member 23 and an upper side member 24. Furthermore, as illustrated in FIGS. 1 and 2, the vehicle body frame 20 includes a pair of side members 25 disposed at lower portions of each vertical frame 21 in the vehicle width direction, and cross members 26 coupling the pair of side members 25.

The vertical frame 21 includes a lower cross member 201, vertical members 202, and an upper cross member 203. The lower cross member 201 extends in a vehicle width direction. The upper cross member 203 is positioned above the lower cross member 201 and extends in the vehicle width direction. Each vertical member 202 extends in a vertical direction to connect an end portion of the lower cross member 201 and an end portion of the upper cross member 203 to each other. The dump body 30 is supported by the upper cross member 203.

The electric motor 43 includes a motor housing 43H supported by the vertical frame 21 of the vehicle body frame 20. In the present embodiment, the motor housing 43H of the electric motor 43 is supported by the lower cross member 201 of the vehicle body frame 20. The lower cross member 201 is a hollow member having an inner space. The electric motor 43 is at least partially stored in the inner space of the lower cross member 201.

The drive shaft 18 is connected to the output shaft 43A of the electric motor 43 and transmits power generated by the electric motor 43 to the decelerator 14.

The decelerator 14 transmits the power of the electric motor 43 transmitted via the drive shaft 18, to the wheel 11. The decelerator 14 includes a planetary gear mechanism to convert a high-speed, low-torque rotational force of the electric motor 43 to a low-speed, high-torque rotational force and transmit the rotational force to the wheel 11.

The power transmission mechanism 45 including the drive shaft 18 and the decelerator 14 is at least partially disposed on the inside of the wheel 11.

The travel unit 40 includes a brake 15 disposed on the inside of the wheel 11 to restrict the rotation of the wheel 11. The brake 15 has a wet oiling brake.

Furthermore, the travel unit 40 includes a drive case 56 for storing at least part of the power transmission mechanism 45. The drive case 56 is disposed on the inside of the wheel 11. The drive case 56 is partially connected to the wheel 11. The planetary gear mechanism of the decelerator 14 has a sun gear connected to the drive shaft 18, and has a planetary gear connected to part of the drive case 56. The decelerator 14 rotatably supports the wheel 11 via the drive case 56. In the present embodiment, the decelerator 14 and the drive shaft 18 are partially stored in the drive case 56. The drive shaft 18 is partially disposed outside the drive case 56.

The travel unit 40 includes a suspension 50. In the present embodiment, the suspension 50 is an independent double wishbone suspension system. The suspension 50 includes a suspension cylinder 53 and a link mechanism 60 which is configured to connect the vehicle body frame 20 and the drive case 56 to each other.

The suspension cylinder 53 connects the vehicle body frame 20 and the drive case 56 to each other. In the present embodiment, the suspension cylinder 53 has an upper end portion connected to a suspension supporting portion 205 provided at the upper cross member 203. The suspension cylinder 53 has a lower end portion connected to the drive case 56 via a connection bracket 54. The suspension cylinder 53 absorbs or damps an impact on a tire 11T.

The link mechanism 60 connects the vehicle body frame 20 and the drive case 56 to each other so as to separate the vehicle body frame 20 from the wheel 11. Owing to the link mechanism 60, the vehicle body frame 20 opposes the wheel 11 and the tire 11T across a gap, and a space is formed between the vehicle body frame 20 and the wheel 11 and tire 11T. The space between the vehicle body frame 20 and the wheel 11 and the tire 11T is an open space opening to an ambient space.

The link mechanism 60 includes an upper arm 51 which has a base end portion connected to the vehicle body frame 20 and has a leading end portion connected to an upper portion of the drive case 56, and a lower arm 52 which has a base end portion connected to the vehicle body frame 20 and a leading end portion connected to a lower portion of the drive case 56. The upper arm 51 and the lower arm 52 each extend in a substantially horizontal direction. The base end portion of the upper arm 51 is vertically swingably supported by the vehicle body frame 20. The base end portion of the lower arm 52 is vertically swingably supported by the vehicle body frame 20. The upper portion of the drive case 56 is rotatably connected to the leading end portion of the upper arm 51. The lower portion of the drive case 56 is rotatably connected to the leading end portion of the lower arm 52.

In the present embodiment, the base end portion of the upper arm 51 is rotatably supported by an upper supporting portion 207 provided at a lower portion of the vertical member 202 of the vertical frame 21. The base end portion of the lower arm 52 is rotatably supported by a lower supporting portion 208 provided at an end portion of the lower cross member 201.

The leading end portion of the upper arm 51 is connected to an upper ball joint 57 provided at the upper portion of the drive case 56. The leading end portion of the lower arm 52 is connected to a lower ball joint 58 provided at the lower portion of the drive case 56. The upper ball joint 57 has an upper surface to which the connection bracket 54 is fixed. The connection bracket 54 and the suspension supporting portion 205 of the vertical frame 21 are connected to each other by the suspension cylinder 53.

When the vehicle body 10 is swung in a vertical direction with swinging of the upper arm 51 and the lower arm 52, a positional relationship between the wheel 11 and the electric motor 43 is slightly shifted. In the present embodiment, the drive shaft 18 is connected to each of the output shaft 43A of the electric motor 43 and an input shaft 14A of the decelerator 14 via a universal joint. Therefore, even if the vehicle body 10 is swung in the vertical direction, a shift between the wheel 11 and the electric motor 43 is absorbed. Furthermore, in the present embodiment, the drive shaft 18 is telescopically slidable in the axial direction. Therefore, a change in the distance between the vehicle body frame 20 and the drive case 56 caused by swinging of the wheel 11 in the vertical direction is absorbed.

The dump truck 1 includes parking brakes 100. Each of the parking brakes 100 restricts the rotation of the corresponding wheel 11 during parking of the dump truck 1. In the present embodiment, the parking brake 100 restricts the rotation of the drive shaft 18 to restrict the rotation of the wheel 11.

The parking brake 100 is disposed in a space between the vehicle body frame 20 and the wheel 11, formed by the link mechanism 60.

[Cooling Structure for Electric Motor]

Figure 4:
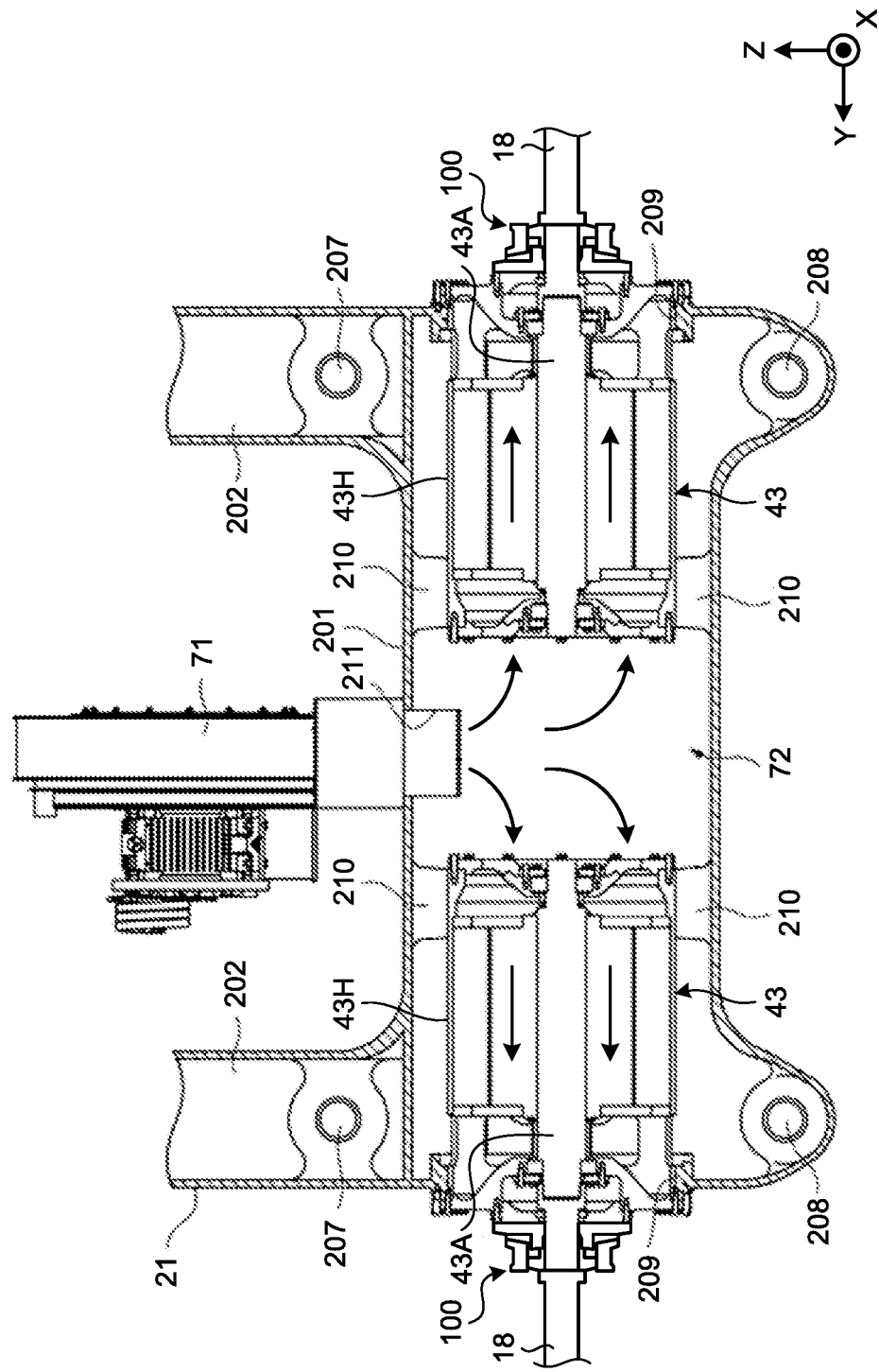
FIG. 4 is an exemplary cross-sectional view of a cooling structure for electric motors according to the present embodiment.

FIG. 4 is an exemplary cross-sectional view of a cooling structure for electric motors 43 according to the present embodiment. As illustrated in FIG. 4, the electric motors 43 are disposed on both sides of the lower cross member 201 in a vehicle width direction. On both sides of the lower cross member 201 in the vehicle width direction, opening portions 209 are provided. The electric motors 43 are disposed at least partially in the respective opening portions 209. The motor housing 43H of each electric motor 43 and the lower cross member 201 of the vehicle body frame 20 are fixed to each other.

The inner space of the lower cross member 201 has projection portions 210. Each of the projection portions 210 projects from an inner surface of the inner space of the lower cross member 201 toward the electric motor 43. A plurality of projection portions 210 is spaced apart around the motor housing 43H. The motor housing 43H of the electric motor 43 is partially supported by the projection portions 210.

The lower cross member 201 has a center portion in the vehicle width direction, where an inlet 211 is provided. The inlet 211 is provided in an upper portion of the lower cross member 201. Above the lower cross member 201, a cooling blower 71 is disposed. The cooling blower 71 delivers cooling air for cooling air to the electric motors 43. The cooling air sent from the cooling blower 71 is supplied into the inner space of the lower cross member 201 via the inlet 211.

Cooling air is supplied from the cooling blower 71 to the inner space of the lower cross member 201 via the inlet 211, flows into a duct portion 72 positioned between a pair of the electric motors 43, and then flows toward the electric motors 43. Cooling air partially flows into spaces between the electric motors 43 and an inner surface of the lower cross member 201, cools the outer surfaces of the motor housings 43H of the electric motors 43, and then flows outside the lower cross member 201 via gaps between the motor housings 43H and the opening portions 209. Furthermore, cooling air partially flows into the motor housings 43H, cools a stator, a mover, and the like of each electric motor 43, and then flows outside each motor housing 43H via a gap provided in at least part of the motor housing 43H.

[Parking Brake]

Figure 5:
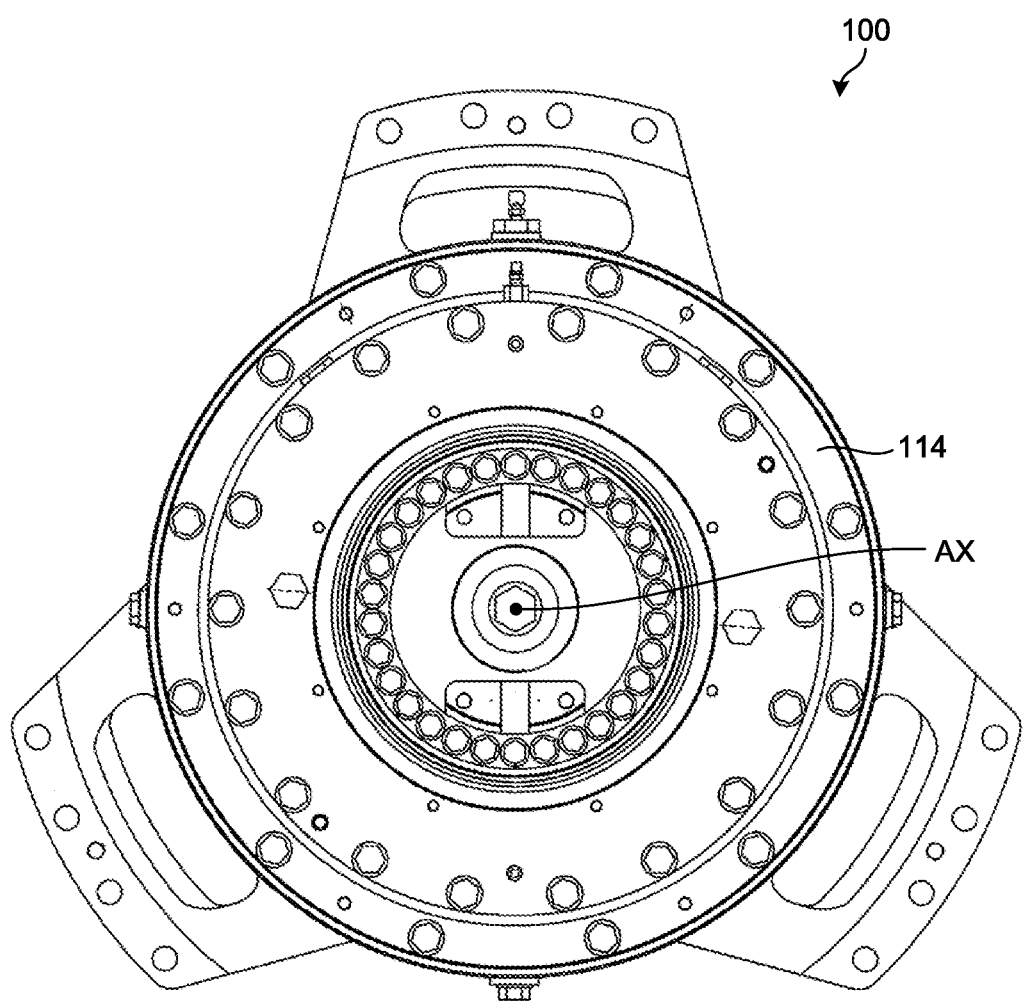
FIG. 5 is an exemplary plan view of a parking brake according to the present embodiment.
Figure 6:
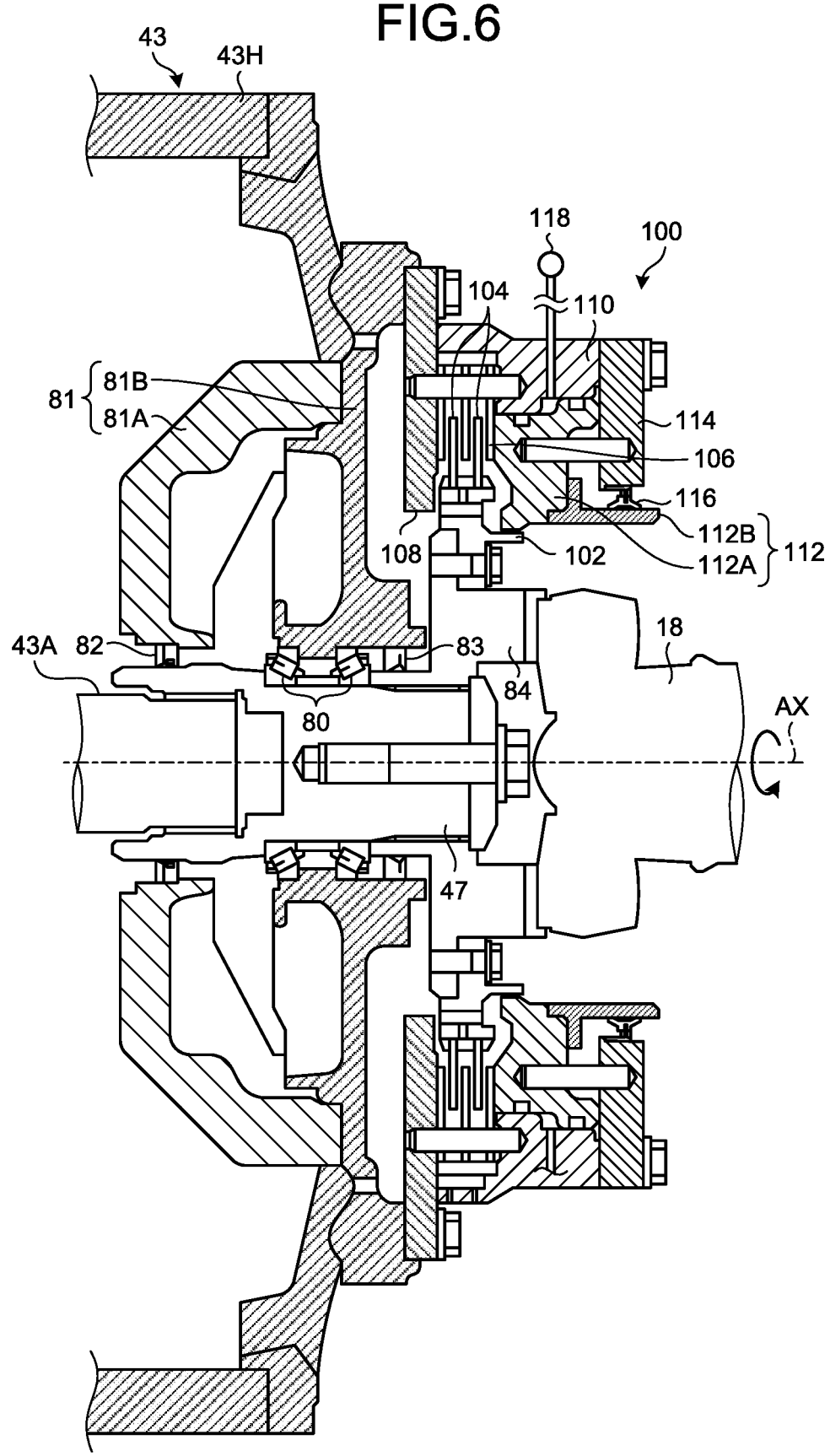
FIG. 6 is an exemplary cross-sectional view of the parking brake according to the present embodiment.
Figure 7:
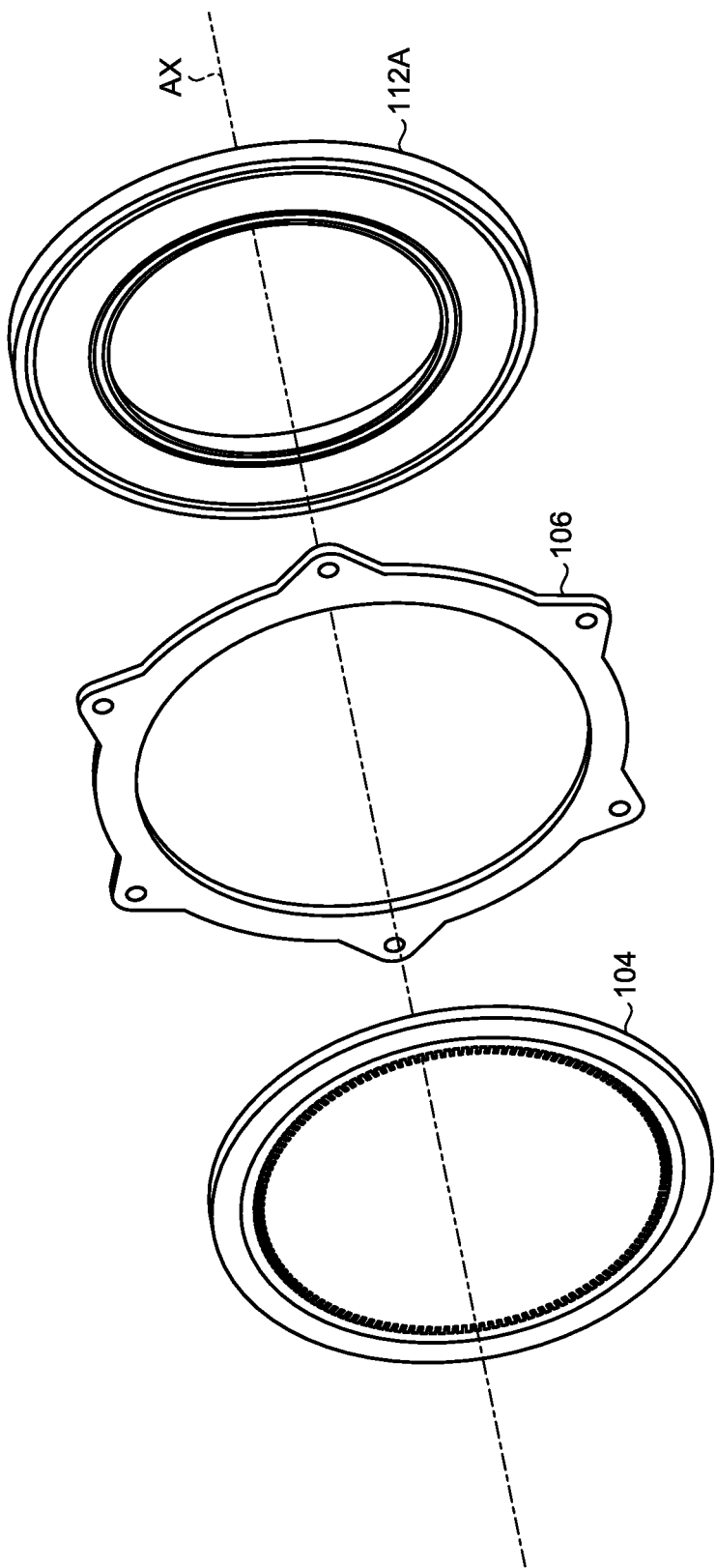
FIG. 7 is an exploded perspective view of part of the parking brake according to the present embodiment.

FIG. 5 is an exemplary plan view of the parking brake 100 according to the present embodiment. FIG. 6 is an exemplary cross-sectional view of the parking brake 100 according to the present embodiment. FIG. 7 is an exploded perspective view of part of the parking brake 100 according to the present embodiment.

As illustrated in FIG. 5, the parking brake 100 is a member disposed around a rotation axis AX. As illustrated in FIG. 6, the output shaft 43A of the electric motor 43 is at least partially stored in the motor housing 43H. The output shaft 43A of the electric motor 43 and the drive shaft 18 of the power transmission mechanism 45 are connected to each other via a connection shaft 47. Note that the connection shaft 47 and the drive shaft 18 may be considered to be integrated with each other.

The drive shaft 18 is rotatably supported by a supporting member 81 via bearings 80. The supporting member 81 rotatably supports the drive shaft 18 about the rotation axis AX. The supporting member 81 is fixed to the motor housing 43H. The supporting member 81 is supported by the vehicle body frame 20 via the motor housing 43H.

In the present embodiment, the supporting member 81 is a bearing case for storing the bearings 80 for rotatably supporting the drive shaft 18. In the following description, the supporting member 81 is referred to as a bearing case 81. In the present embodiment, the bearing case 81 includes a first case member 81A and a second case member 82B.

In a direction parallel to the rotation axis AX, one of the bearings 80 is provided with an oil seal 82 and the other of the bearings is provided with an oil seal 83. The oil seal 82 and the oil seal 83 seal between the connection shaft 47 and the bearing case 81.

The parking brake 100 is provided on the outside of the bearing case 81. Note that the parking brake 100 may be provided at the motor housing 43H. In this configuration, the motor housing 43H serves as the supporting member.

The parking brake 100 includes a disk 104 supported by a hub 102, a separator plate 106 supported by a cylinder 110, an end plate 108 supported by the bearing case 81, a piston 112 movable relative to the cylinder 110 in a direction parallel to the rotation axis AX, a cylinder plate 114 fixed to the cylinder 110, and a dust seal 116 for sealing between the piston 112 and the cylinder plate 114.

The end plate 108 is fixed to the bearing case 81 by a bolt. Furthermore, the end plate 108 is fixed to the cylinder 110 by a pin. The end plate 108 is provided so as to surround the rotation axis AX.

The piston 112 includes a first member 112A disposed to make contact with a separator plate 106, and a second member 112B for forming a gap between the second member 112B and the cylinder plate 114 to dispose the dust seal 116 therebetween. The piston 112 is disposed near the wheel 11 (outside in the vehicle width direction) relative to the end plate 108, in a direction parallel to the rotation axis AX. As illustrated in FIG. 7, the piston 112 (first member 112A) is an annular member disposed so as to surround the rotation axis AX.

The hub 102 is disposed between the end plate 108 and the piston 112 in a direction parallel to the rotation axis AX. The hub 102 is connected to the drive shaft 18. In the present embodiment, the hub 102 is fixed to the connection shaft 47 and the drive shaft 18 via a coupling 84.

The disk 104 is supported by the hub 102. As illustrated in FIG. 7, the disk 104 is an annular member disposed so as to surround the rotation axis AX. A plurality of disks 104 is spaced apart in a direction parallel to the rotation axis AX.

The separator plate 106 is supported by the cylinder 110. As illustrated in FIG. 7, the separator plate 106 is an annular member disposed so as to surround the rotation axis AX. The separator plate 106 is movable in a direction parallel to the rotation axis AX by the piston 112. A plurality of separator plates 106 is spaced apart in a direction parallel to the rotation axis AX. Each of the separator plates 106 is disposed next to each disk 104 in a direction parallel to the rotation axis AX. The separator plates 106 are disposed between the disks 104. The separator plates 106 are at least partially disposed radially outwardly from the disks 104 relative to the rotation axis AX.

The cylinder 110 supports the separator plates 106. The cylinder 110 is disposed radially outwardly from the hub 102 and the piston 112 relative to the rotation axis AX. The cylinder 110 is fixed to the bearing case 81 via the end plate 108. Note that the cylinder 110 may be fixed to the motor housing 43H via the end plate 108.

The cylinder plate 114 is fixed to the cylinder 110 by a bolt. The cylinder 110 and the cylinder plate 114 may be considered to be integrated with each other. The dust seal 116 is provided between the cylinder plate 114, which is fixed to the cylinder 110, and the piston 112.

In the present embodiment, when the electric motor 43 is operated, the output shaft 43A, the connection shaft 47, and the drive shaft 18 are rotated about the rotation axis AX. When the connection shaft 47 is rotated, the coupling 84, the hub 102, and the disks 104, all of which are fixed to the connection shaft 47, are rotated about the rotation axis AX, together with the output shaft 43A, the connection shaft 47, and the drive shaft 18. That is, the output shaft 43A, the connection shaft 47, the drive shaft 18, the coupling 84, the hub 102, and the disks 104 are a rotator rotated by the operation of the electric motor 43.

In contrast, the motor housing 43H, the bearing case 81, the separator plates 106, the end plate 108, the cylinder 110, the piston 112, and the cylinder plate 114 are a stator not rotated when the electric motor 43 is operated.

The piston 112 is moved in a direction parallel to the rotation axis AX by a hydraulic pressure supplied from a hydraulic pressure supply device 118. In the present embodiment, oil is supplied from the hydraulic pressure supply device 118 into a space between the piston 112 and the cylinder 110, and when a hydraulic pressure is applied to the piston 112, the piston 112 is moved to be separated from the separator plate 106.

Figure 8:
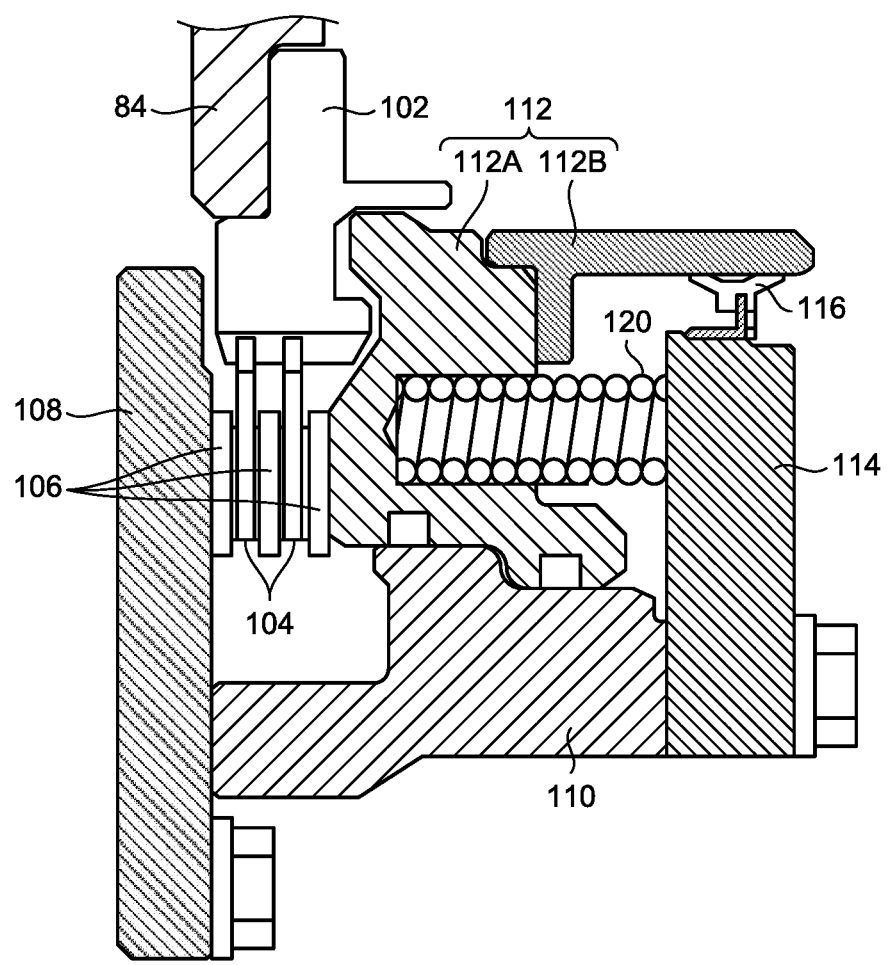
FIG. 8 is a cross-sectional view of part of the parking brake according to the present embodiment.

FIG. 8 is a cross-sectional view of part of the parking brake 100 according to the present embodiment. FIG. 8 illustrates the parking brake 100 where no hydraulic pressure is applied to the piston 112. In the present embodiment, a spring 120 is disposed between the piston 112 and the cylinder plate 114. The spring 120 generates a resilient force so that the piston 112 comes closer to the separator plate 106.

As illustrated in FIG. 8, when no hydraulic pressure is applied to the piston 112, the piston 112 is moved to come closer to the separator plate 106 by the resilient force of the spring 120. When the piston 112 is moved toward the separator plate 106, the separator plate 106 is displaced. Therefore, the plurality of separator plates 106 and the plurality of disks 104 are brought into contact with each other, as illustrated in FIG. 8. Therefore, the rotation of the disks 104 is suppressed. The suppression of the rotation of the disks 104 restricts the rotation of the rotator including the output shaft 43A, the connection shaft 47, the drive shaft 18, the coupling 84, the hub 102, and the disks 104.

That is, in the present embodiment, when the supply of a hydraulic pressure from the hydraulic pressure supply device 118 is stopped, the parking brake 100 restricts the rotation of the drive shaft 18.

In contrast, when a hydraulic pressure is supplied from the hydraulic pressure supply device 118, the piston 112 is moved to be separated from the separator plate 106. When the piston 112 is moved to be separated from the separator plate 106, the separator plate 106 is displaced. Therefore, the plurality of separator plates 106 and the plurality of disks 104 are separated from each other, as illustrated in FIG. 6. Therefore, braking by the parking brake 100 is released.

[Abrasion Powder Discharge Method]

Next, an abrasion powder discharge method according to the present embodiment will be described. When a disk 104 and a separator plate 106 are brought into contact with each other, abrasion powder may be generated. In the present embodiment, air as cooling air supplied from the cooling blower 71 discharges the generated abrasion powder from the parking brake 100. Furthermore, the air supplied from the cooling blower 71 inhibits the intrusion of foreign matter into the parking brake 100.

Figure 9:
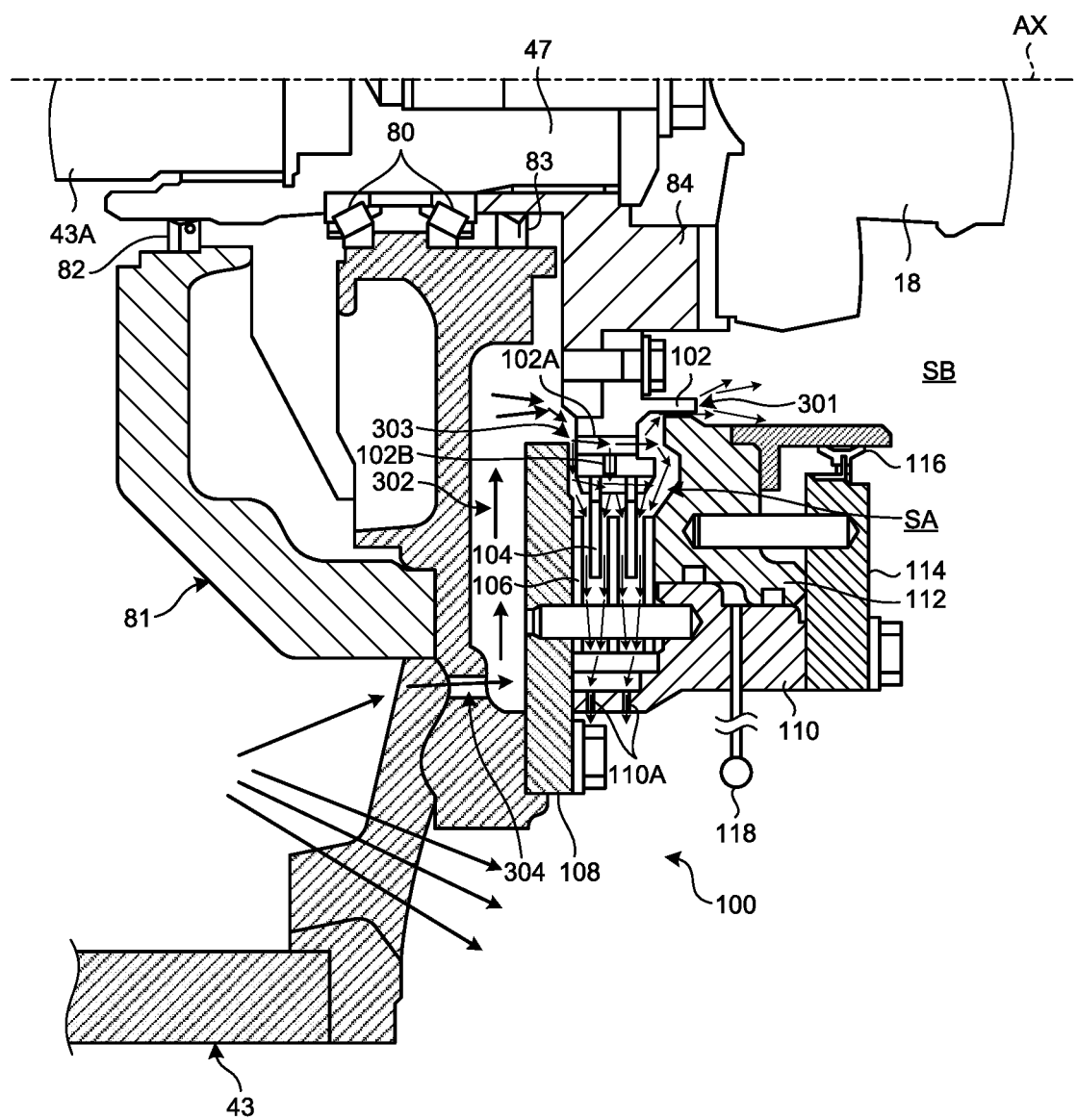
FIG. 9 is an exemplary schematic diagram illustrating an abrasion-powder discharge method for the parking brake according to the present embodiment.

FIG. 9 is an exemplary schematic diagram illustrating the abrasion-powder discharge method for the parking brake 100 according to the present embodiment. As illustrated in FIG. 9, the end plate 108, the piston 112, the hub 102, and the cylinder 110 define an inner space SA. The disks 104 and the separator plates 106 are disposed in the inner space SA.

The parking brake 100 includes a first outlet passage 301 for connecting the inner space SA and an outer space SB, and a second outlet passage 110A for connecting the inner space SA and the outer space SB. The outer space SB is an ambient space between the vehicle body frame 20 and the wheel 11 and tire 11T.

The second outlet passage 110A is provided radially outwardly from the first outlet passage 301 relative to the rotation axis AX.

The first outlet passage 301 is provided between the piston 112 and the hub 102. In the present embodiment, the first outlet passage 301 includes a gap provided between the piston 112 and the hub 102.

The second outlet passage 110A is provided in the cylinder 110. In the present embodiment, the second outlet passage 110A includes an inner flow passage provided in the cylinder 110.

The second outlet passage 110A is provided in a lower portion of the cylinder 110. The second outlet passage 110A has an inner diameter larger than the size of the gap between the piston 112 and the hub 102.

The piston 112 is moved relative to the hub 102 in a direction parallel to the rotation axis AX. The gap between the piston 112 and the hub 102 enables smooth movement of the piston 112. The size of the gap between the piston 112 and the hub 102 is small enough to enable air in the inner space SA to flow out to the outer space SB and prevent the intrusion of foreign matter from the outer space SB into the inner space SA.

The abrasion powder generated by the contact of the disk 104 and the separator plate 106 is discharged from the inner space SA to the outer space SB through the second outlet passage 110A.

As illustrated in FIG. 9, the dump truck 1 includes a supply flow passage 302 provided between the bearing case 81 and the end plate 108, and a first inlet passage 303 for connecting the supply flow passage 302 and the inner space SA.

The first inlet passage 303 is provided between the end plate 108 and the hub 102. In the present embodiment, the first inlet passage 303 includes a gap provided between the end plate 108 and the hub 102.

The first outlet passage 301 is disposed near the wheel 11 (outside in the vehicle width direction) relative to the first inlet passage 303, in a direction parallel to the rotation axis AX.

The air sent from the cooling blower 71 passes through the motor housing 43H and reaches the bearing case 81. The bearing case 81 is provided with a second inlet passage 304. The second inlet passage 304 supplies the air from the cooling blower 71 to the supply flow passage 302. The air sent from the cooling blower 71 and passing through the motor housing 43H is supplied to the supply flow passage 302 through the second inlet passage 304. The air supplied from the cooling blower 71 is supplied to the inner space SA through the supply flow passage 302 and the first inlet passage 303.

In the present embodiment, the second inlet passage 304 is disposed radially outwardly from the first inlet passage 303 relative to the rotation axis AX. Accordingly, the air supplied to the supply flow passage 302 through the second inlet passage 304 flows radially inward relative to the rotation axis AX and then is supplied to the inner space SA through the first inlet passage 303.

The air supplied from the first inlet passage 303 to the inner space SA flows in the inner space SA and then is discharged from the first outlet passage 301 to the outer space SB. In the first outlet passage 301, the flow of the air from the inner space SA to the outer space SB inhibits the intrusion of foreign matter from the outer space SB to the inner space SA through the first outlet passage 301.

In the present embodiment, a bypass flow passage 102A is provided in the hub 102. The bypass flow passage 102A has an inlet facing the supply flow passage 302, and the bypass flow passage 102A has an outlet disposed in the vicinity of the first outlet passage 301 of the inner space SA. In the present embodiment, not all of the air from the supply flow passage 302 is supplied to the disks 104. The air from the supply flow passage 302 is partially supplied to the disks 104 through the first inlet passage 303, and the air from the supply flow passage 302 partially flows in the bypass flow passage 102A without being supplied to the disks 104. Therefore, excessive air is inhibited from being supplied to a disk 104. Since excessive air is prevented from being supplied to part of the disk 104, abnormal vibration of the disk 104 caused by supplying excessive air is suppressed.

The first inlet passage 303 is provided at an end of the inner space SA in a direction parallel to the rotation axis AX. Therefore, the air supplied from the first inlet passage 303 to the inner space SA may not be fully supplied to the plurality of disks 104. In the present embodiment, the hub 102 is internally provided with a connection flow passage 102B for connecting the bypass flow passage 102A and the inner space SA to each other. The connection flow passage 102B has an outlet provided in a center portion of the inner space SA in a direction parallel to the rotation axis AX. Cooling air flowing in the bypass flow passage 102A is partially supplied to the inner space SA through the connection flow passage 102B, and the cooling air is fully supplied to the plurality of disks 104.

The first inlet passage 303 and the connection flow passage 102B are provided radially inwardly from the disks 104 relative to the rotation axis AX. In the travel of the dump truck 1, the disks 104 are rotated about the rotation axis AX together with the drive shaft 18. The air flowing into the inner space SA from the first inlet passage 303 and the connection flow passage 102B flows radially outward relative to the rotation axis AX by the rotation of the disks 104. Therefore, the air is fully supplied to an outer edge portion of each disk 104. Furthermore, in the inner space SA, an air flow is generated to be directed from the inside to the outside in the radial direction relative to the rotation axis AX, and abrasion powder in the inner space SA is moved toward the cylinder 110 by the force of the air. Furthermore, the abrasion powder in the inner space SA is also moved toward the cylinder 110 by a centrifugal force generated by the rotation of the drive shaft 18. That is, in the present embodiment, owing to a synergistic effect between the air flow, which is generated in the inner space SA, and the centrifugal force, the abrasion powder in the inner space SA, which is generated from the disk 104 or the separator plate 106, is moved from the inside to the outside in the radial direction relative to the rotation axis AX.

The abrasion powder in the inner space SA which is moved from the inside to the outside in the radial direction relative to the rotation axis AX is discharged to the outer space SB through the second outlet passage 110A provided in the cylinder 110. The abrasion powder in the inner space SA is discharged from the inner space SA to the outer space SB together with the air. Furthermore, in the second outlet passage 110A, the force of the air flowing from the inner space SA to the outer space SB and the centrifugal force inhibit the intrusion of foreign matter from the outer space SB to the inner space SA through the second outlet passage 110A.

[Functions and Effects]

As described above, according to the present embodiment, when the disks 104 and the separator plates 106 are provided in the inner space SA defined by the end plate 108, the piston 112, the hub 102, and the cylinder 110, the first outlet passage 301 is provided between the piston 112 and the hub 102 and the second outlet passage 110A is provided in the cylinder 110. Therefore, abrasion powder generated in the inner space SA is smoothly discharged to the outer space SB through the second outlet passage 110A. Furthermore, an air flow generated in the first outlet passage 301 and an air flow generated in the second outlet passage 110A inhibit the intrusion of foreign matter from the outer space SB to the inner space SA through the first outlet passage 301 and the second outlet passage 110A.

Furthermore, since the piston 112 is moved relative to the hub 102 and the cylinder 110 in a direction parallel to the rotation axis AX, the piston 112 can move smoothly due to a gap formed between the piston 112 and the hub 102. Furthermore, the size of the gap between the piston 112 and the hub 102 is small enough to inhibit the intrusion of foreign matter from the outer space SB to the inner space SA while maintaining an air flow from the inner space SA to the outer space SB in the first outlet passage 301.

Furthermore, the second outlet passage 110A is provided in the cylinder 110 disposed radially outward of the inner space SA relative to the rotation axis. Therefore, a synergistic effect between the air flow and the centrifugal force smoothly discharges the abrasion powder in the inner space SA to the outer space SB through the second outlet passage 110A.

Furthermore, in the present embodiment, the supply flow passage 302 to which the air from the cooling blower 71 is supplied is provided between the bearing case 81 and the end plate 108, and the first inlet passage 303 for connecting the supply flow passage 302 and the inner space SA is provided between the end plate 108 and the hub 102. Thus, the air supplied from the cooling blower 71 to the electric motor 43 is efficiently used to supply the air to the inner space SA, generating the air flow in the inner space SA.

Furthermore, in the present embodiment, the first inlet passage 303 is provided radially inwardly from the disks 104 relative to the rotation axis AX. Accordingly, the air is allowed to be supplied to the disks 104 radially inward relative to the rotation axis AX. When the disks 104 are rotated about the rotation axis AX in the travel of the dump truck 1, the air flowing into the inner space SA from the first inlet passage 303 flows radially outward relative to the rotation axis AX. Therefore, the air is allowed to be fully supplied to an outer edge portion of each disk 104. Owing to a synergistic effect between the air flow, generated in the inner space SA, and the centrifugal force, abrasion powder is moved from the inside to the outside in the radial direction relative to the rotation axis AX and discharged from the second outlet passage 110A.

Furthermore, in the present embodiment, the second inlet passage 304 for supplying the air from the cooling blower 71 to the supply flow passage 302 is provided in the bearing case 81, and the second inlet passage 304 is disposed radially outwardly from the first inlet passage 303 relative to the rotation axis AX. Accordingly, the air supplied to the supply flow passage 302 through the second inlet passage 304 flows radially inward relative to the rotation axis AX into the inner space SA through the first inlet passage 303, and flows radially outward relative to the rotation axis AX in the inner space SA. Owing to such a flow passage configuration, the air from the cooling blower 71 is drawn inwardly, and the parking brake 100 can be reduced in size.

Furthermore, in the present embodiment, the dust seal 116 is provided between the cylinder 110 (cylinder plate 114) and the piston 112. Therefore, the piston 112 is smoothly moved, and, moreover, the intrusion of foreign matter into the inner space SA is inhibited.

Note that the dump truck 1 according to the present embodiment is a four-wheel-drive dump truck which is provided with the electric motors 43 for the respective four wheels 11. The electric motor 43 may be provided at either the wheels 11F or the wheels 11R. Note that the dump truck 1 according to the present embodiment may be a four wheel steered dump truck.

Note that, in the present embodiment, the dump truck 1 is an autonomous off-road dump truck which autonomously travels. The dump truck 1 may be a manned off-road dump truck provided with a cab and operated by a driver in the cab.

Note that, in the present embodiment, the work vehicle 1 is a dump truck having the dump body 30. The work vehicle 1 may be, however, a vehicle without the dump body 30.

REFERENCE SIGNS LIST

1 DUMP TRUCK (WORK VEHICLE)
10 VEHICLE BODY
11 WHEEL
11F WHEEL
11R WHEEL
11T TIRE
14 DECELERATOR
15 BRAKE
14A INPUT SHAFT
18 DRIVE SHAFT
20 VEHICLE BODY FRAME
21 VERTICAL FRAME
21F VERTICAL FRAME
21R VERTICAL FRAME
23 LOWER SIDE MEMBER
24 UPPER SIDE MEMBER
25 SIDE MEMBER
26 CROSS MEMBER
30 DUMP BODY
37 PIVOT PORTION
40 TRAVEL UNIT
43 ELECTRIC MOTOR
43A OUTPUT SHAFT
43H MOTOR HOUSING
45 POWER TRANSMISSION MECHANISM
47 CONNECTION SHAFT
50 SUSPENSION
51 UPPER ARM
52 LOWER ARM
53 SUSPENSION CYLINDER
54 CONNECTION BRACKET
56 DRIVE CASE
57 UPPER BALL JOINT
58 LOWER BALL JOINT
60 LINK MECHANISM
71 COOLING BLOWER
72 DUCT PORTION
80 BEARING
81 BEARING CASE (SUPPORTING MEMBER)
82 OIL SEAL
83 OIL SEAL
84 COUPLING
100 PARKING BRAKE
102 HUB
102A BYPASS FLOW PASSAGE
102B CONNECTION FLOW PASSAGE
104 DISK
106 SEPARATOR PLATE
108 END PLATE
110 CYLINDER
110A SECOND OUTLET PASSAGE
112 PISTON
112A FIRST MEMBER
112B SECOND MEMBER

114 CYLINDER PLATE
116 DUST SEAL
118 HYDRAULIC PRESSURE SUPPLY DEVICE
120 SPRING
201 LOWER CROSS MEMBER
202 VERTICAL MEMBER
203 UPPER CROSS MEMBER
205 SUSPENSION SUPPORTING PORTION
207 UPPER SUPPORTING PORTION
209 OPENING PORTION
210 PROJECTION PORTION
211 INLET
301 FIRST OUTLET PASSAGE
302 SUPPLY FLOW PASSAGE
303 FIRST INLET PASSAGE
304 SECOND INLET PASSAGE
AX ROTATION AXIS
SA INNER SPACE
SB OUTER SPACE

The invention claimed is:

1. A work vehicle comprising:
a vehicle body frame;
an electric motor supported by the vehicle body frame;
a power transmission mechanism including a drive shaft connected to an output shaft of the electric motor, the power transmission mechanism transmitting power generated by the electric motor to a wheel on which a tire is mounted;
a supporting member supported by the vehicle body frame, the supporting member rotatably supporting the drive shaft; and
a parking brake configured to restrict a rotation of the drive shaft,
the parking brake including:
an end plate supported by the supporting member;
a piston disposed near the wheel relative to the end plate in an axial direction parallel to a rotation axis of the drive shaft, the piston moving in the axial direction;
a hub disposed between the end plate and the piston in the axial direction, the hub being connected to the drive shaft;
a cylinder disposed outwardly from the hub and the piston in a radial direction relative to the rotation axis;
a disk supported by the hub and disposed in an inner space defined by the end plate, the piston, the hub, and the cylinder;
a separator plate supported by the cylinder, disposed next to the disk in the inner space, and moved by the piston in the axial direction;
a first outlet passage configured to connect the inner space and an outer space, the outer space being an ambient space between the vehicle body frame and the wheel and the tire; and
a second outlet passage provided outwardly from the first outlet passage in the radial direction, the second outlet passage connecting the inner space and the outer space,
the first outlet passage being provided between the piston and the hub,
the second outlet passage being provided in the cylinder.

2. The work vehicle according to claim 1, further comprising:
a blower configured to supply air to the electric motor;
a supply flow passage provided between the supporting member and the end plate; and
a first inlet passage configured to connect the supply flow passage and the inner space,
wherein the air supplied from the blower is supplied to the inner space through the supply flow passage and the first inlet passage.

3. The work vehicle according to claim 2, wherein
the first inlet passage is provided radially inwardly from the disk.

4. The work vehicle according to claim 2, further comprising
a second inlet passage configured to supply air from the blower to the supply flow passage,
wherein the second inlet passage is disposed outwardly from the first inlet passage in the radial direction.

5. The work vehicle according to claim 4, wherein
the piston is moved in the axial direction relative to the cylinder, and
the work vehicle comprises a dust seal configured to seal between the cylinder and the piston.

* * * * *